H. Y. HILDEBRAND.
PLANTER WHEEL.
APPLICATION FILED FEB. 12, 1915.

1,238,405.　　　　　　　　　　　　　　　Patented Aug. 28, 1917.

WITNESSES:　　　　　　　　　　　　　　　　　　INVENTOR
Elmer Seavey　　　　　　　　　　　　　　　Henry Y. Hildebrand.
F. A. Stahl.　　　　　　　　　　　　　　　　　BY
　　　　　　　　　　　　　　　　　　　Geo. E. Thackray
　　　　　　　　　　　　　　　　　　　　his ATTORNEY

UNITED STATES PATENT OFFICE.

HENRY Y. HILDEBRAND, OF JOHNSTOWN, PENNSYLVANIA, ASSIGNOR TO CAMBRIA STEEL COMPANY, A CORPORATION OF PENNSYLVANIA.

PLANTER-WHEEL.

1,238,405.

Specification of Letters Patent.

Patented Aug. 28, 1917.

Application filed February 12, 1915. Serial No. 7,706.

*To all whom it may concern:*

Be it known that I, HENRY Y. HILDEBRAND, a citizen of the United States, residing in the city of Johnstown, in the county of Cambria and the State of Pennsylvania, have invented certain new and useful Improvements in Planter-Wheels; and I do hereby declare the following to be a full, clear, and exact description of the invention, such as will enable others skilled in the art to which it appertains to make and use the same.

My invention relates to planter wheels with particular reference to those which are adapted to roll a slight furrow in the ground, the wheel being preferably roughened by corrugations or otherwise, so that it has tractive force to enable it to operate or assist in operating the seed dropping or other mechanism of the planter.

Figure 1:
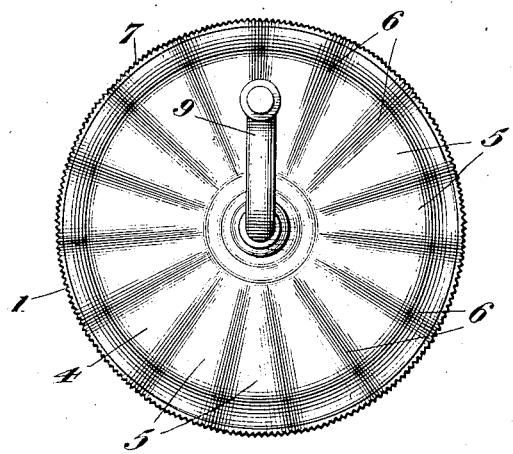
Figure 2:
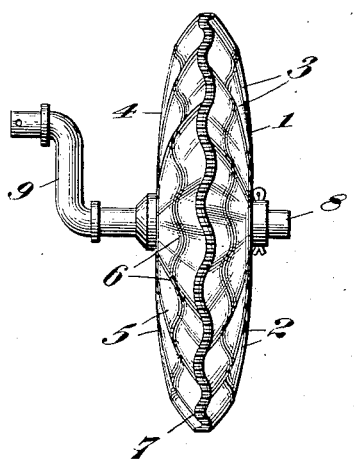
Figure 3:
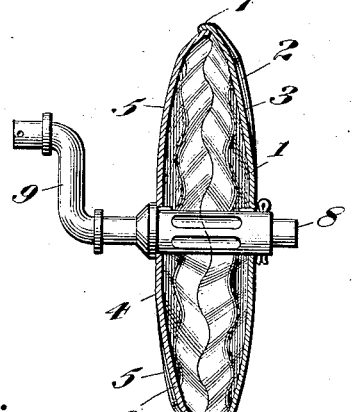
Figure 4:
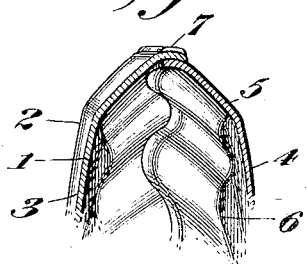

Referring now to the annexed sheet of drawings in which like characters and figures represent like parts:—Figure 1 is a side elevation of my planter wheel, Fig. 2 is an end elevation thereof, Fig. 3 is a central cross sectional elevation and Fig. 4 is a cross sectional elevation of the outer portion of the wheel drawn to a larger scale showing the means for securing together the two portions of same.

Referring now to the characters of reference on the drawings:—1 represents a concavo-convex metallic disk which is roughened or radially corrugatd as shown, the projecting portions of the corrugations being indicated as 2 and the depressed portions thereof being indicated as 3, 4 represents a companion disk of similar construction, but originally of somewhat smaller diameter than the disk 1, this disk 4 also being provided with projections or corrugations 5 and depressions 6. This pair of disks is placed together with their convexities outward and their concavities inward and the outer edge of the portion 7 of disk 1 is bent and beaded over the adjacent edge of the disk 4, this construction being more fully illustrated in Fig. 4. This beading securely locks the two disks together, closes the peripheral joint between them and enables them to do the work intended without wearing their edges away.

The edges of planter wheels not provided with this beading will wear away, earth will come between the two disks of which they are formed and will gradually force or wedge the disks apart, thus rendering the planter wheel useless, all of which is avoided by my construction.

The beading 7 may be accomplished by placing the two wheels together, rotating them and applying to the edge of the one of large diameter a beading tool, which may be either stationary and rounded or may be a revolving tool either smooth or knurled as desired. This turns the edge of the disk 1 over the other disk 4 and provides turned over, or beaded edge 7 as described. The beading 7 may thus be serrated or knurled as shown in Figs. 1, 2 and 4 or smooth as shown in Fig. 3.

The pair of disks is mounted on a crank shaft 8 which is adapted to revolve in suitable bearings on the planter or other tool, the shaft being provided with a crank 9 which is adapted to operate the seed dropping, agitating or other mechanism as desired.

Although I have shown the disk as radially corrugated it may be roughened otherwise or may be wavy in other directions or otherwise constructed so that it does not slip in the earth.

Although I have described and illustrated my invention in considerable detail, I do not wish to be limited to the exact and specific details thereof, as shown and described, but may use such modifications in, substitutions for, or equivalents thereof, as are embraced within the scope of my invention, or as pointed out in the claims.

Having thus described my invention, what I claim and desire to secure by Letters Patent is:—

1. A planter wheel composed of a pair of concavo-convex disks radially corrugated to the edges thereof, one of larger diameter than the other, with its edge bent over the adjacent disk.

2. A planter wheel comprising a pair of dished disks radially corrugated to the edges thereof, placed with their peripheries in contact and concavities inward, one disk being of slightly larger diameter than the other and with its edge turned over the edge of the adjacent disk.

3. A planter wheel comprising a pair of dished disks radially corrugated to the edges thereof, placed with their peripheries in contact and their convexities outward, one disk being of slightly larger diameter than the other and with its edge turned over the edge of the adjacent disk, said wheel being mounted and secured on a shaft.

4. A planter wheel composed of a pair of dished disks radially corrugated to their edges, placed with their peripheries in contact and their concavities inward, one disk being of slightly larger diameter than the other and with its edge turned over the edge of the adjacent disk, said wheel being mounted on a shaft provided with a crank.

In witness whereof I have hereunto set my hand in the presence of two witnesses.

HENRY Y. HILDEBRAND.

Witnesses:
OLIVER B. HICKOX,
ELMER SEAVEY.